United States Patent
Kumar (10) Patent No.: US 8,783,574 B2
(45) Date of Patent: Jul. 22, 2014

(54) PERIPHERAL UNIT ADAPTED TO VARIABLY SIZED HANDHELD HOST DEVICES

(75) Inventor: Rajendra Kumar, Akron, OH (US)

(73) Assignee: Khyber Technologies Corporation, Akron, OH (US)

( * ) Notice: Subject to any disclaimer, the term of this patent is extended or adjusted under 35 U.S.C. 154(b) by 635 days.

(21) Appl. No.: 11/568,342

(22) PCT Filed: May 5, 2005

(86) PCT No.: PCT/IB2005/051479
§ 371 (c)(1),
(2), (4) Date: Oct. 26, 2006

(87) PCT Pub. No.: WO2005/104655
PCT Pub. Date: Nov. 10, 2005

(65) Prior Publication Data
US 2008/0192410 A1    Aug. 14, 2008

Related U.S. Application Data (60) Provisional application No. 60/568,477, filed on May 5, 2004.

(51) Int. Cl.
*G06K 7/10* (2006.01)
*G06F 1/16* (2006.01)

(52) U.S. Cl.
USPC ............ 235/462.45; 235/462.43; 235/472.01; 361/679.02

(58) Field of Classification Search
USPC .......................... 235/462.43, 462.45, 472.01; 361/679.02; 455/575.1; 248/160, 161
See application file for complete search history.

(56) References Cited

U.S. PATENT DOCUMENTS

| | | | |
|---|---|---|---|
| 4,237,540 A | | 12/1980 | Sato |
| 5,033,709 A | * | 7/1991 | Yuen ............................ 248/313 |

(Continued)

FOREIGN PATENT DOCUMENTS

| | | |
|---|---|---|
| AU | 4906896 | 8/1996 |
| DE | 33 23 858 A1 | 3/1985 |

(Continued)

OTHER PUBLICATIONS

Hewlett Packard of Palo Alto, California, Dual-Slot Card Expansion Pack for iPaq PDA devices, website: http://www.shopping.hp.com/cgi-bin/hpdirect/shopping/scripts/product_detail/product?det . . . , Apr. 26, 2004.

(Continued)

*Primary Examiner* — Michael G Lee
*Assistant Examiner* — Laura Gudorf
(74) *Attorney, Agent, or Firm* — Hahn, Loeser & Parks, LLP (57) ABSTRACT

The invention relates to a peripheral unit system that provides a universally usable system for adding peripheral functions to off-the-shelf handheld host devices of variable size and configuration. The system and methods according to the invention allow adaptation to variably sized handheld host devices without the need to customize the peripheral unit to the host device. The invention provides added functionality such as increased ruggedness and durability, while providing an integrated system in association with a handheld host device, to provide the convenience of a one-piece form-factor, without sacrificing universality of the solution. The peripheral unit comprises a housing having a portion configured to engage with a handheld host device of various sizes and electrical configurations. An attachment mechanism is associated with the housing, being used to selectively secure the housing to the handheld host device to form a one-piece apparatus suitable for handheld use. The attachment mechanism is secured to the host device by selective adjustment of the size to adapt to a host device. In addition, the peripheral unit may provide a universal connection to at least one electrical connector of the host device, to provide added input-output functions to the operation of the combined system.

43 Claims, 8 Drawing Sheets

(56) References Cited

U.S. PATENT DOCUMENTS

| | | | |
|---|---|---|---|
| 5,057,676 A | | 10/1991 | Komaki |
| 5,241,303 A | | 8/1993 | Register et al. |
| 5,268,816 A | | 12/1993 | Abell, Jr. et al. |
| 5,276,589 A | | 1/1994 | Bartlett et al. |
| 5,278,779 A | | 1/1994 | Conway et al. |
| 5,349,497 A | * | 9/1994 | Hanson et al. ............ 361/679.58 |
| 5,383,138 A | | 1/1995 | Motoyama et al. |
| 5,548,477 A | | 8/1996 | Kumar |
| 5,638,257 A | | 6/1997 | Kumar et al. |
| 6,119,179 A | * | 9/2000 | Whitridge et al. ............... 710/72 |
| 6,320,962 B1 | * | 11/2001 | Eisenbraun .................. 379/446 |
| 6,427,959 B1 | * | 8/2002 | Kalis et al. ............... 248/288.11 |
| 6,657,654 B2 | * | 12/2003 | Narayanaswami ........ 348/14.04 |
| 6,708,887 B1 | | 3/2004 | Garrett et al. |
| 6,837,435 B2 | | 1/2005 | Kehoe et al. |
| 7,028,905 B2 | * | 4/2006 | Sato et al. ................. 235/462.45 |
| 2002/0009194 A1 | * | 1/2002 | Wong et al. .................... 379/449 |
| 2002/0099895 A1 | * | 7/2002 | Landron et al. ............... 710/303 |
| 2002/0186525 A1 | * | 12/2002 | Singh ........................... 361/680 |
| 2003/0006998 A1 | * | 1/2003 | Kumar .......................... 345/700 |
| 2003/0173242 A1 | | 9/2003 | Fisher, Jr. et al. |
| 2003/0209604 A1 | | 11/2003 | Harrison, Jr. |
| 2004/0204163 A1 | * | 10/2004 | Ou ............................. 455/569.1 |
| 2006/0105821 A1 | * | 5/2006 | Goradesky et al. ......... 455/575.1 |

FOREIGN PATENT DOCUMENTS

| | | |
|---|---|---|
| EP | 0827605 | 3/1998 |
| WO | 9623251 | 8/1996 |

OTHER PUBLICATIONS

Socket Communications of Newark, California, CF card based peripherals such as In-Hand Scan Card, website: http://www.socketcom.com/product/bar.asp, Apr. 27, 2004.

Arkon Resource Inc. of Arcadia, California, Cable-connected peripheral units such as Digital Wireless Stereo Music Adapter model SF250, website: http://www.arkon.com/sf.html, Apr. 27, 2004.

Seidio Inc. of Houston, Texas, Universal Mount Kit for PDA devices, website: www.seidio.com or www.seidio-europe.com, Oct. 24, 2003.

Alien Technologies of Morgan Hill, California, OEM module model ALR-9930, website: http://www.alientechnology.com/02_products_p02s3.html, Apr. 26, 2004.

IBM Technical Disclosure Bulletin, Multiple Human Interfaces for a Common Central Electronic Complex, vol. 36, No. 9A, Sep. 1, 1993, p. 3/4 XP000395121.

Patent Abstracts of Japan, vol. 018, No. 460 (P-1793), Aug. 26, 1994 & JP 06 149412 A (Brother Ind Ltd), May 27, 1994.

Editor Opinion, Pen Computing Magazine, vol. 1, No. 1, pp. 5-6 (Aug. 1994).

"Pen Based Buyer's Guide", Pen Computing Magazine, vol. 1, No. 1, pp. 86-89 (Aug. 1994).

"PDA Buyer's Guide", Pen Computing Magazine, vol. 1, No. 1, pp. 83 & 84 (Aug. 1994).

Advertisement for EHT-30 Handheld Computer, Seiko Epson Corporation (Oct. 1993).

Advertisement for IBM Think Pad 750 Family Notebook Computers (Sep. 1993).

\* cited by examiner

PERIPHERAL UNIT ADAPTED TO VARIABLY SIZED HANDHELD HOST DEVICES

This application is a U.S. national stage of PCT International Application No. PCT/IB2005/051479 filed on May 5, 2005, which claimed priority to U.S. Provisional Ser. No. 60/568,477, filed May 5, 2004, which are both hereby incorporated by reference.

TECHNICAL FIELD

The invention relates to devices and systems to provide added functionality to off-the-shelf handheld computing devices or host devices. The systems and methods of the invention may provide added protection to the host device against mechanical shock, and/or may add peripheral functions to the host device when combined therewith.

BACKGROUND OF THE INVENTION

There are a number of commercially available products that provide computing functionality in a handheld device, which may be termed a "host device." Such host devices may include examples such as portable digital assistance (PDA) cell phones and smart phones, as well as various other handheld computing devices, which may or may not have wireless communication capabilities. Although such devices perform a variety of computing and other tasks, they are generally limited in terms of functionality, and it would be desirable to provide additional functionality in conjunction therewith, using the computing power of the host device in performing other functions in a selective fashion. For example, it would be desirable to provide the ability to add peripheral functions such as bar code scanning, radio frequency identification (RFID) reading, key-entry, wireless communications, telecommunications, and network communications as examples.

It is also noted that in commercially available host devices of this type, the form-factor of the devices varies significantly from one device to the next. Differing form-factors for the handheld devices makes it difficult to adapt a peripheral device to a variety of variably sized or configured handheld host devices, such that any peripheral systems are generally customized or configured specifically for a particular handheld computing device. In addition to variable size and form-factor of such devices, the configuration of the devices is also variable, such as with respect to electrical or communication connectors associated therewith. Although devices within a group of host devices generally have standard electrical connectors, such as Compact Flash (CF) socket and USB connector, the relative positions of such connections generally vary from one device to the next. Again such variation generally requires any peripheral devices to be specifically constructed for mating with a particular host device.

Thus, in order to cope with the variations in the form-factor described above from one host device to the next, peripheral units are tailored to a specific host device, being customized for use with the specific host device. Examples of some currently available solutions are (a) custom-fitted peripheral units such as a Dual-Slot Card Expansion Pack for iPaq PDA devices, both offered by Hewlett Packard® of Palo Alto, Calif. and U.S. Pat. No. 5,349,497 of Hanson et. al.; (b) CF card based peripherals such as In-Hand Scan Card from Socket Communications of Newark, Calif.; (c) cable-connected peripheral units such as Digital Wireless Stereo Music Adapter model SF250 from Akron Resource Inc of Arcadia, Calif.; (d) Universal Mount Kit for PDA devices offered by Seidio Inc of Houston, Tex.

As will be evident from a review of known attempts at providing peripheral functions in association with such host devices, the custom-fitted solutions have drawbacks, in that such systems must be constantly reengineered as new models of host devices are introduced into the market. This delays market introduction of such peripherals, and adds to the cost thereof. Further, with CF card peripherals for example, such systems have an oversized module portion which are prone to damage when impacted due to a fall or bumping into external objects during use. Alternatively, if the peripheral unit is connected by a loose-cable connection such connections are cumbersome for handheld use, because they eliminate the one-piece configuration of the handheld host device. Attempts at providing side grips employed in universal cradle mounts are also bulky and fail to provide means of holding a host device in a secure manner for use in handheld operations.

Based upon the foregoing, it would be desirable to provide a peripheral unit which can adapt to variably sized and configured handheld host devices, to be selectively combined with a host device to result in a one-piece, handheld configuration. It would also be desirable to provide a peripheral unit which can provide added protection to a host device combined therewith, against mechanical shock or other external forces to which the combined system may be subjected. It would be a further advantage to provide a peripheral unit which can add highly desirable input/output functions, such as bar code scanning, RFID reading, key-entry, wireless communications, telecommunications, and/or network communications for examples.

Based upon the foregoing, the present invention provides a peripheral system and methods which overcome the limitations of the prior art, and provide these distinct advantages as well as other objectives and advantages.

SUMMARY OF THE INVENTION

Based upon the foregoing, it is an object of the invention to provide a peripheral unit system that will eliminate the above-mentioned drawbacks, and provide a universally usable system for adding peripheral functions to off-the-shelf handheld host devices of variable size and configuration. The system and methods according to the invention allow adaptation to variably sized handheld host devices without the need to customize the peripheral unit to the host device. It is a further object of the invention to provide added functionality such as increased ruggedness and durability, while providing an integrated system in association with a handheld host device, to provide the convenience of a one-piece form-factor, without sacrificing universality of the solution.

In one aspect, the invention is directed to a peripheral unit to provide additional functionality when combined with an off-the-shelf, handheld host device. The unit comprises a housing having a portion configured to engage with a handheld host device of various sizes and electrical configurations. An attachment mechanism is associated with the housing, being used to selectively secure the housing to the variable handheld host device to form a one-piece apparatus suitable for handheld use. The attachment mechanism is secured to the host device by selective adjustment of the size to adapt to a host device. In addition, the peripheral unit may provide a universal connection to at least one electrical connector of the host device, to provide added input-output functions to the operation of the combined system.

In a further aspect of the invention, the peripheral unit provides an attachment mechanism having at least two arms and an adjustment mechanism, wherein the arms attach to the handheld host device on opposing sides thereof, with the adjustment mechanism adapted to move at least one of the arms with respect to the other arm, for selective engagement with the host device.

These and other objects and advantages of the present invention will become apparent upon a further reading of the Detailed Description in conjunction with the drawings.

BRIEF DESCRIPTION OF THE DRAWINGS

First preferred embodiment of the current invention is illustrated in FIGS. 1 through 4. Second preferred embodiment is illustrated in FIG. 5 and the third embodiment is illustrated in FIGS. 6A and 6B.

DETAILED DESCRIPTION OF THE INVENTION

Figure 1:
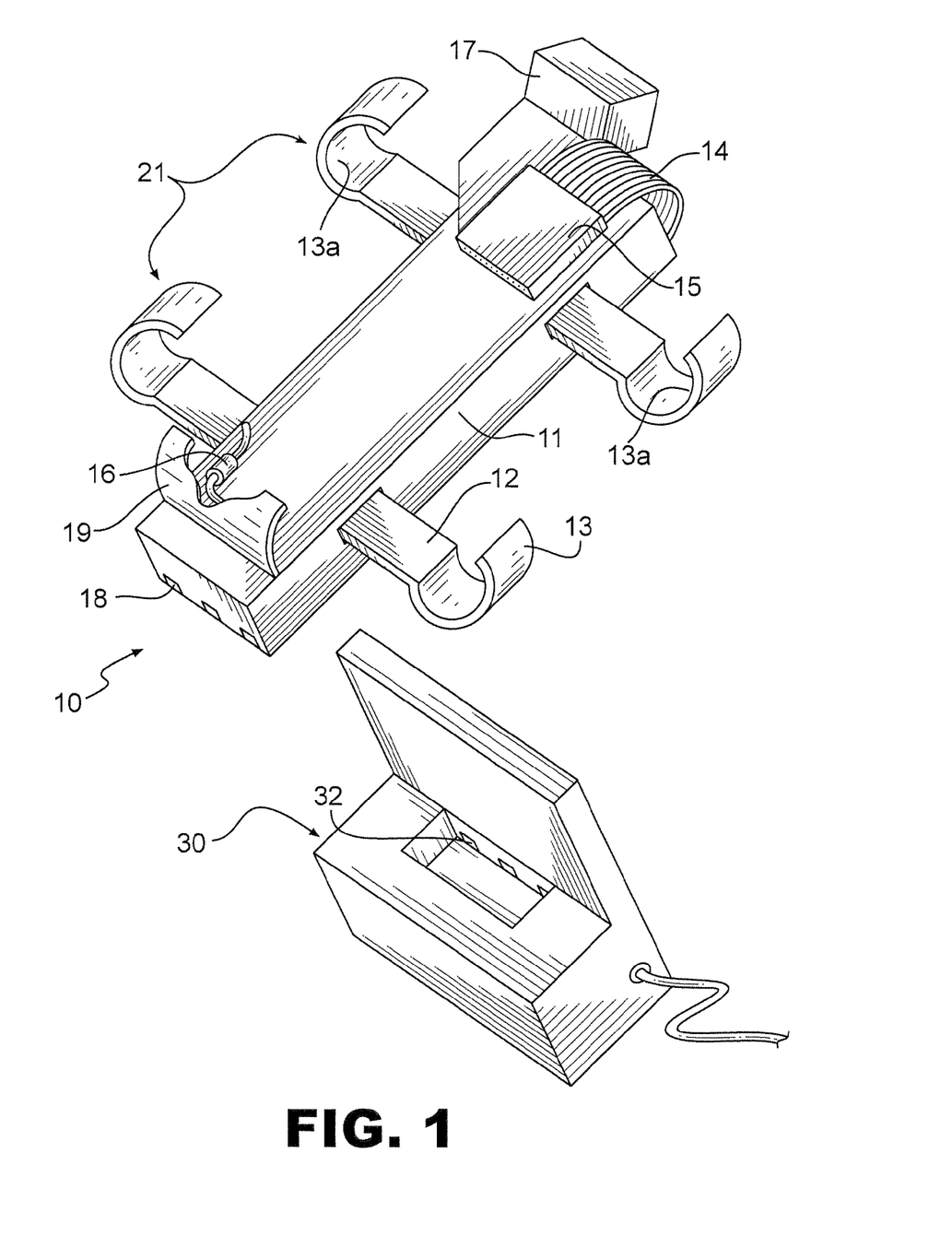
FIG. 1 is a top perspective view of an exemplary device in accordance with the present invention showing both a peripheral unit and a charging cradle.

Turning now to FIG. 1, there is shown a perspective view of an exemplary device according to the invention, wherein the capabilities and functions of the invention can be understood. In this embodiment, the peripheral unit 10 has a housing or main body portion 11, and an attachment system or mechanism 21. The housing 11 may be configured to be thin and have a long axis, which will make it suitable for engagement with variably sized and configured handheld host computing devices. Such host devices may include PDAs, smart phones, cell phones or any other handheld computing device. The housing 11 is shaped and sized to mate with such variably sized handheld host devices in an unobtrusive manner, due to the small size and slim configuration thereof. At the same time, the housing 11 provides support for added functionalities, as will be hereinafter described with reference to various embodiments. There are electrical or other connections provided in association with the housing 11. In the configuration as shown, the peripheral unit 10 may be used to add a bar code scanning functionality to a handheld host device, such as a laser bar code scanner, having scanner housing portion 17. A ribbon cable 14 may be interchangeably used to connect the scanner via a CF card 15 provided at a top portion of housing 11. In this configuration, the CF card 15 is easily connected to a connection port on the host device, provided at a top portion thereof. Other connecting cables may be used for other standard connection ports. The housing 11 may also be configured to have charging contacts 18 positioned to be selectively connected to matching contacts 32 associated with a charge cradle 30, as an example. The peripheral unit, whether engaged with a host device or not, may be seated in the charge cradle 30 for charging of a peripheral power source provided in housing 11. Such a power source may then operate added functions such as the bar code scanning system, but may also be used for charging of a battery supply associated with the host device. In this regard, an interchangeable DC jack 16 may be provided for selective connection to the host device. For full functionality, the DC jack 16 may be selectively changed, so a suitable connector for any particular host device may be used.

Figure 2:
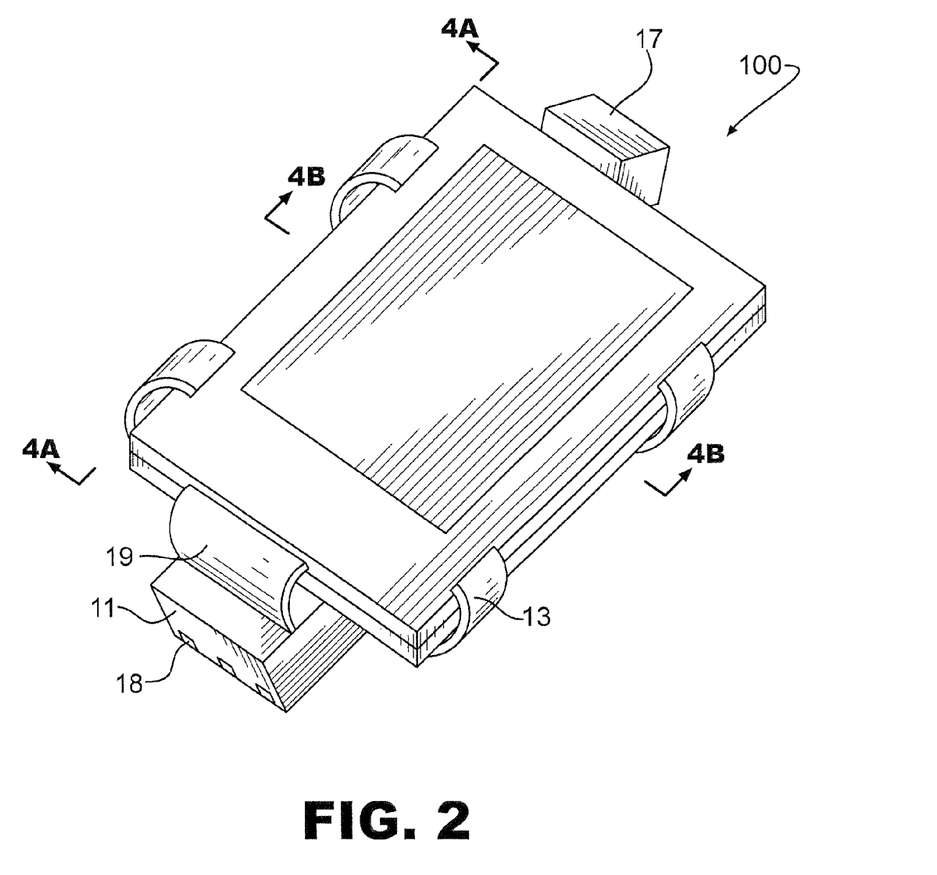
FIG. 2 is a top perspective view an assembly of the exemplary device shown mounted on the backside of an off-the-shelf host unit.
Figure 3:
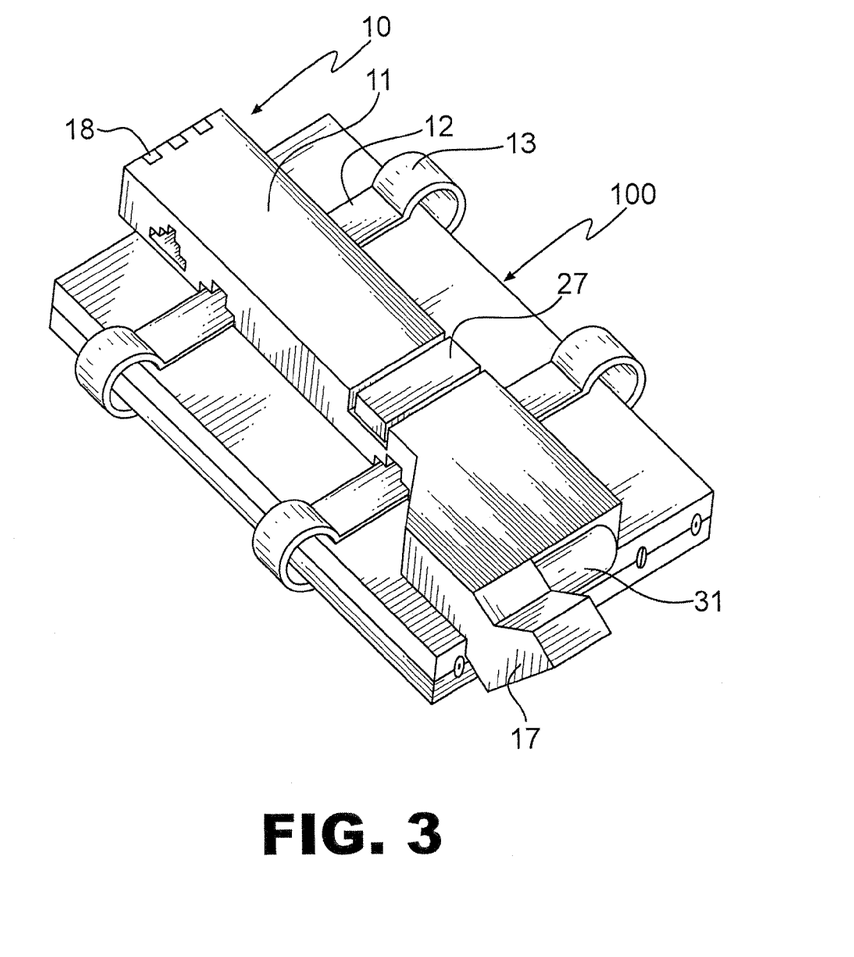
FIG. 3 is a bottom view of the assembly shown in FIG. 2.

As seen in FIGS. 2 and 3, the unit 10 may be selectively engaged to a host device 100. The unit 10 is securely engaged to the host unit 100 by means of the attachment mechanism 21, to form a one-piece apparatus suitable for handheld use. The attachment mechanism 21 is selectively secured to the host device 100 by selective adjustment of the size thereof to adapt to any particular host device 100 with which it may be used. In this embodiment, the attachment mechanism 21 comprises at least two attachment arms 12 provided on opposing sides of housing 11. The extent of the arms 12 extending away from housing 11 is selectively adjustable, with a maximum extent accommodating the variable sizes of handheld host computing devices 100 as described. In the embodiment shown, multiple arms 12 are provided, such as adjacent to the top and bottom portions of housing 11, and each of the arms 12 terminates with a coupling hook member 13. In this embodiment, the hook members 13 are shaped to securely engage the side edges of any variably sized or configured handheld host unit 100, by means of the arcuate engaging surfaces 13a associated therewith. The arcuate surfaces 13a are sized to extend around the variable thickness edges of various host devices 100. The arcuate configuration of surfaces 13a will then engage the front and back corners of the side edges of host device 100 for positive securement to the host device 100, regardless of its particular size or shape.

Figure 4A:
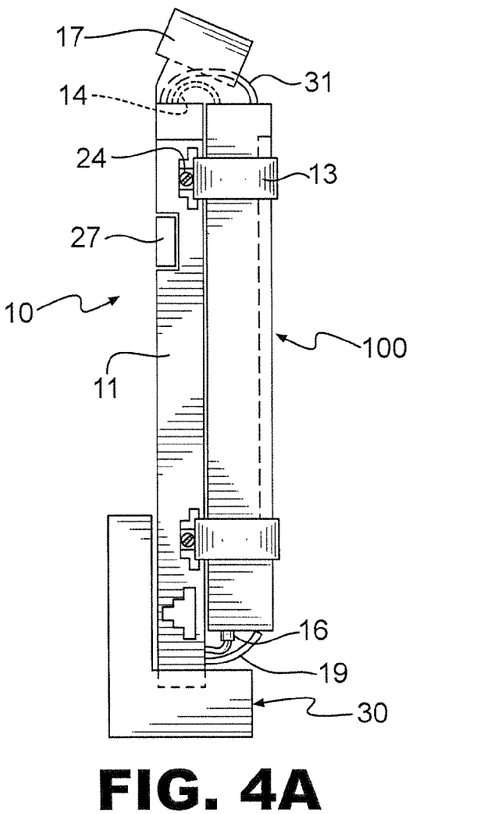
FIG. 4A is a left side view the assembly shown in FIG. 2
Figure 4B:
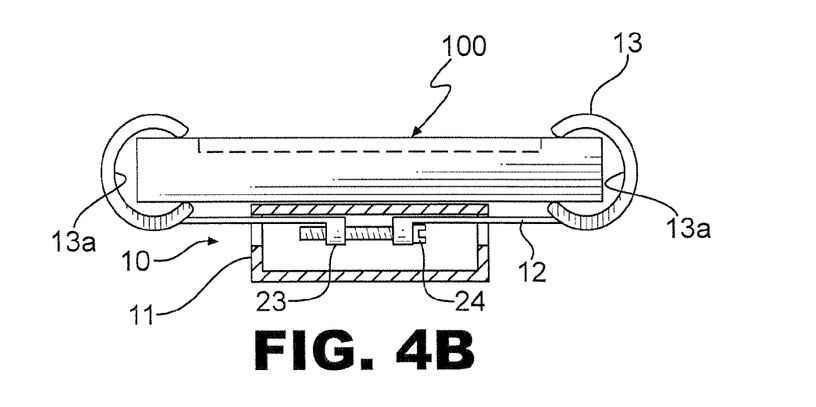
FIG. 4B is a cross-sectional view of the assembly shown in FIG. 2.

As seen in FIGS. 4a and 4b, the handheld host device 100 may have the peripheral unit engaged on a back portion thereof, with the low profile housing 11 not adding significantly to the housing configuration of the handheld host device 100. When unit 10 is engaged with host device 100, the integral one-piece system produced thereby provides an easily used handheld configuration, wherein any functions of the host unit 100 may be accessed or performed, and any added functionality provided by unit 10 may also be accessed or used. The added functionalities of unit 10 are also integrated in association with host device 100, with computing and processing capabilities provided by the host device processor and/or a separate processor provided in unit 10. As shown in this embodiment, the DC jack 16 may be selectively coupled to the device 100 to supply power thereto from a battery supply provided in unit 10. The ribbon cable 14 is selectively coupled to the host device 100, to selectively couple the scanner provided in housing 17 for operation in conjunction with host computing device 100. In this embodiment, to add the functionality of laser bar code scanning, a trigger 27 may be provided in association with housing 11 for selective actuation of the scanner associated therewith. The full integration of peripheral systems associated with unit 10 in conjunction with host device 100, provides a fully functional one-piece system for handheld use as desired.

In this embodiment, the arms 12 may be adjustably supported in conjunction with housing 11, to accommodate variably sized host devices 100. Any suitable adjustment mechanism may be used in accordance with the invention, and the example shown in this embodiment is merely a possible design choice thereof. Other suitable arrangements would occur to those skilled in the art. As shown in this embodiment, each of the arms 12 may have supporting elements 23 having a threaded aperture to which a screw 24 or the like may be selectively engaged. As should be recognized, upon rotation of screw 24, the arms 12 will adjust relative to one another, to accommodate any variably sized host device 100.

In conjunction with various functionalities that may be provided with unit 10, the housing 11 and attachment mechanism 21 also provide resistance against shock impact on host device 100, if the integrated assembly is dropped or bumped into an external object. The side edges, as well as back surface of the device 100 are protected by the unit 100 and associated attachment mechanism 11. In addition, the unit 10 may be provided with additional protective features, such as a cable cover 19 provided for covering connection of DC cable 16, and/or a ribbon cable cover 31 for protecting the connection of CF card 15 to device 100 as an example. The cable covers 19 and 31 protect the connections from getting bumped or otherwise damaged, and also prevent the cables from becoming tangled into other objects during use.

In this embodiment, it should be noted in FIG. 4B that the main-body portion 11 can be positioned laterally by sliding along the arms 12 until the CF card termination 15 is aligned with a corresponding CF socket on the handheld host unit 100. The main-body portion can be fixed in that position by screwing in the bolt 24 into the threaded element 23 until the arms 12 and the hooks 13 are pulled in tight, thereby securing the peripheral unit 10 to the off-the-shelf handheld host unit 100. Similarly, the position of the main-body portion 11 can be adjusted longitudinally along the length of the handheld host unit 100 until a desired engagement is obtained. For example, in the correct position of the peripheral unit 10, there should be no undesired interference between external components of the handheld host unit 100 and the external components of the peripheral unit 10 such as the arms 12, the hooks 13, the scanner housing portion 17, the charge-cable cover 19, and ribbon-cable cover 31.

Figure 5:
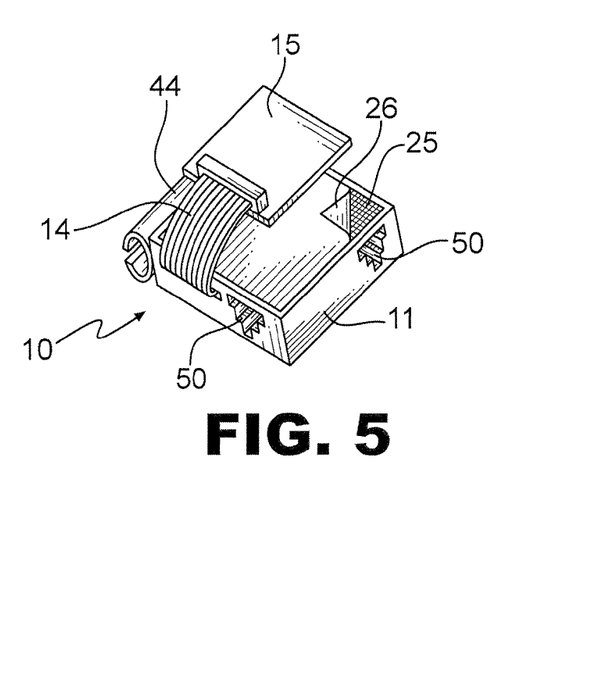
FIG. 5 is a top perspective view of the second embodiment of an exemplary device in accordance with the present invention, having an adhesive-coated portion

Turning to FIG. 5, an alternative embodiment of the invention is shown. In this embodiment, a low profile housing 11 may have an adhesive coated portion 25 for selective engagement to a host device 100. The adhesive coated portion 25 may be initially covered with a user-removable coversheet 26, for selective attachment to any portion of a host device 100 after removal thereof. Alternatively, a hook and loop fastening system may be used, with a portion provided on housing 11 and a portion on device 100. A ribbon cable 14 having a CF card or other suitable connection may be provided similarly to the embodiment as shown previously. A holster 41 may be provided for use as a wand holder or other suitable holder for a scanning device as an example. Multiple inlet/outlet or communication ports 15 may be provided in association with housing 11 for selective coupling to a handheld host unit 100. Thus, added functions provided in association with unit 10 are combined with the host device 100 while forming a one-piece integrated system for handheld use.

Figure 6A:
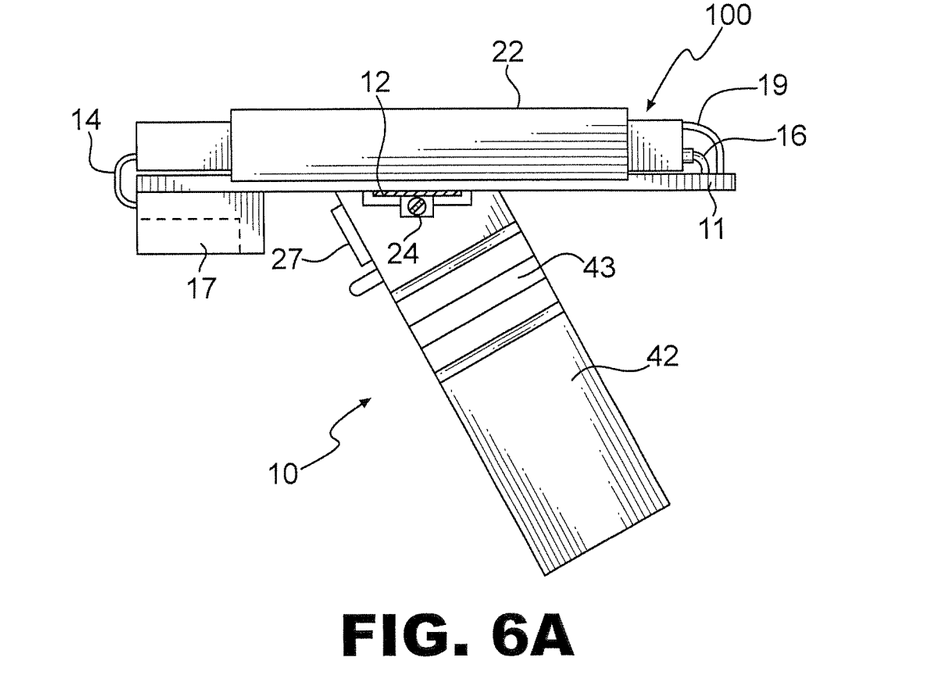
FIGS. 6A and 6B are side views of the third embodiment of an exemplary device in accordance with the present invention, having a handle.
Figure 6B:
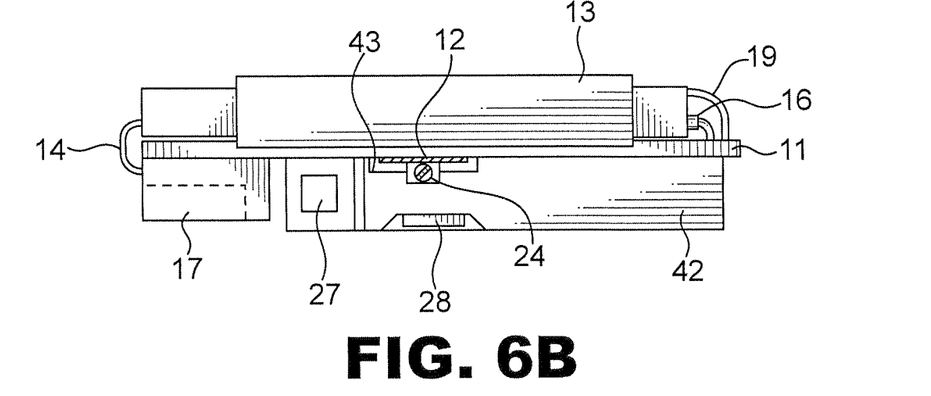

FIGS. 6A and 6B show the third embodiment in accordance with the present invention, whereby the peripheral unit 10 also includes a handle 42, which can be attached to the main-body portion 11 in multiple positions, including a position pointing away from the main-body portion 11 as shown in FIG. 6A, and a position pointing along the main-body portion as shown in FIG. 6B. In this embodiment, the main-body portion 11 is securely attached to an off-the-shelf handheld host unit 100 via a pair of flanges 22. The scanner housing portion 17 is positioned completely under the handheld host unit 100. Alternatively, the scanner housing portion 17 can be positioned along the main-body portion as shown in the first embodiment in FIGS. 1 through 4. In other respects, this embodiment may operate in ways similar to that in earlier embodiments described above.

Alternatively in this embodiment, an RFID reader may be provided in association with the peripheral unit 10. This can be achieved by providing interconnections as described in FIG. 8 for a RFID reader 173, a peripheral unit processor 119, auxiliary battery 117, and power supply circuit 116. For example, a suitable RFID reader is available as an OEM module model ALR-9930 from Alien Technologies of Morgan Hill, Calif. The RFID reader can be packaged into the handle 42 along with the said auxiliary battery and the said power supply circuit. The said peripheral unit processor and the RFID antenna can be packaged in the main-body portion 11.

Figure 7A:
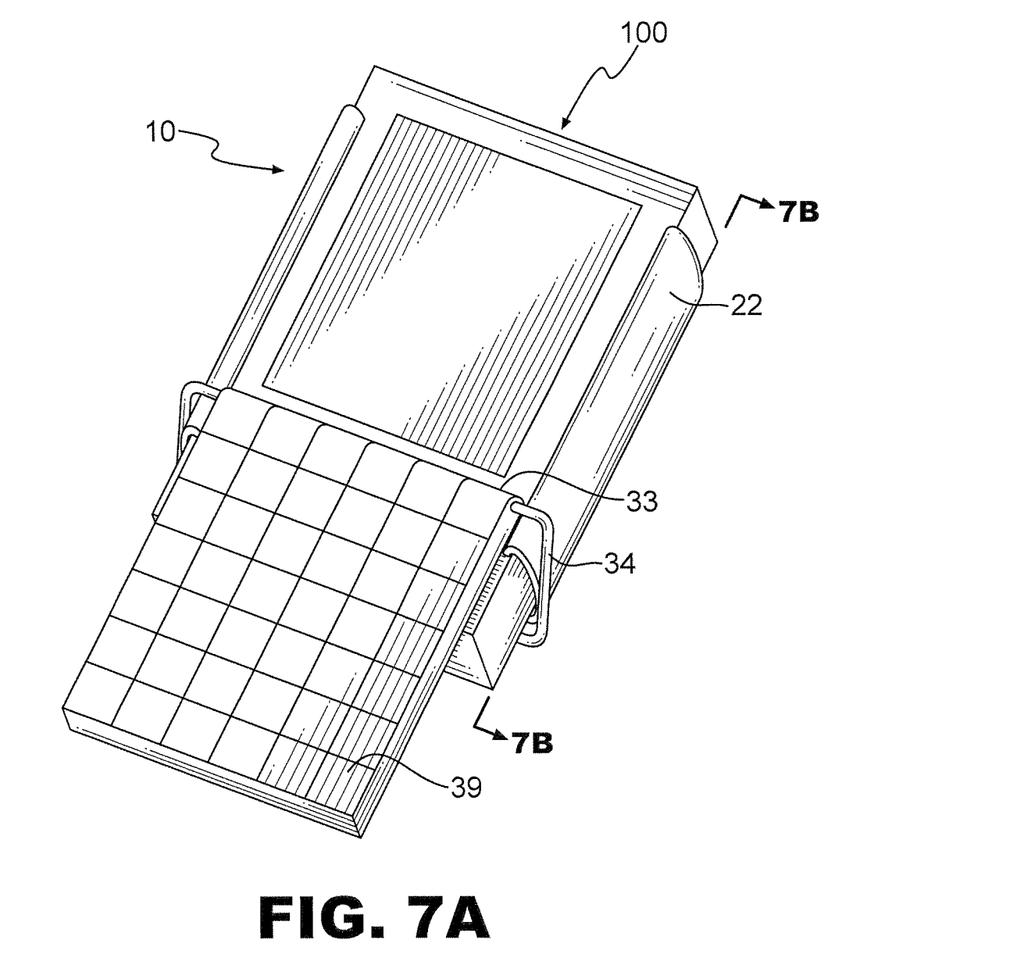
FIGS. 7A and 7B are top perspective view and right side view of the fourth embodiment of an exemplary device in accordance with the present invention, having a keyboard that also serves as a lid over the display screen of the handheld host unit.
Figure 7B:
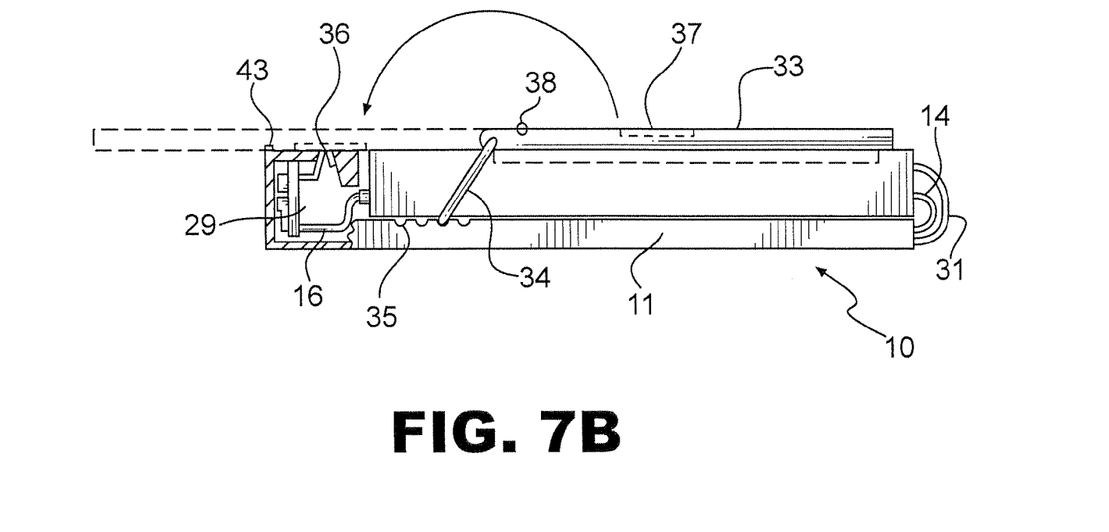

A further embodiment of the invention is shown in FIGS. 7a and 7b, wherein the peripheral unit 10 according to the invention provides additional functionalities. In this embodiment, the peripheral unit 10 includes a keyboard module 33, which is selectively coupled in a low profile adjustable manner to the host device 100. In this embodiment as an example, the keyboard module 33 is hingedly connected to the host device 100 by means of a pair of hinge-arms 34. The hinge-arms 34 are selectively retained by the housing or main body portion 11 of unit 10, such as shown in FIG. 7b. To further facilitate functionality, the housing 11 may include multiple notches 35 or the like, where the hinge-arms 34 are selectively retained, thereby positioning the keyboard module 33 in a desired position relative to the front surface of the host device 100. As an example, the user may selectively position the keyboard module 33 to substantially cover the display screen of the off-the-shelf handheld host device 100 of various sizes. For use, the keyboard module 33 may be flipped or moved between an open position as shown in FIG. 7a, and a closed position as shown in FIG. 7b, where the display of device 100 is protected. The keyboard module 33 may be provided with a keypad 39 on a side thereof, and keyboard contacts 37 for selective connection to a keyboard connector 36 provided in unit 10. As an example, the configuration may allow suitable connection between the keyboard contacts 37 and keyboard connector 36 when the keyboard module 33 is in the open position. To further facilitate functionality, the keyboard module 33 may be held in position when in the open position, with the assistance of frictional force between a keyboard groove 38 and one of a set of keyboard retention ridges 43 carried on a surface of the end portion 29 of housing 11. It should be noted that for proper operation of the keyboard module 33, the mechanical arrangement of the keyboard retention ridges 43 will be a duplicate of the arrangement of the notches 35. This technique will ensure that there will be a properly positioned keyboard retention ridge 43 to mate with the keyboard retention groove 38, regardless of which notch 35 is used to assemble the peripheral unit 10 in association with the handheld host unit 100. Other suitable adjustment mechanisms to allow selective positioning of keyboard module 33 would also occur to those skilled in the art, and are contemplated in the invention. Also as shown in this embodiment, a pair of flanges 22, having an arcuate engaging portion may be used for selective engagement of the housing 11 in association with device 100.

In another embodiment of an exemplary device in accordance with the present invention, a different scheme of providing the keyboard capability can be used. For example, a technique described in detail in U.S. Pat. No. 5,638,257 of the inventor of the present invention, can be used instead of the keyboard method described above, and this patent is hereby incorporated herein in its entirety by reference. In the case of the employment of the '257 patent, the keyboard module will go through a planar motion between the open and closed positions instead of flipping over as described above for the fourth embodiment.

Figure 8:
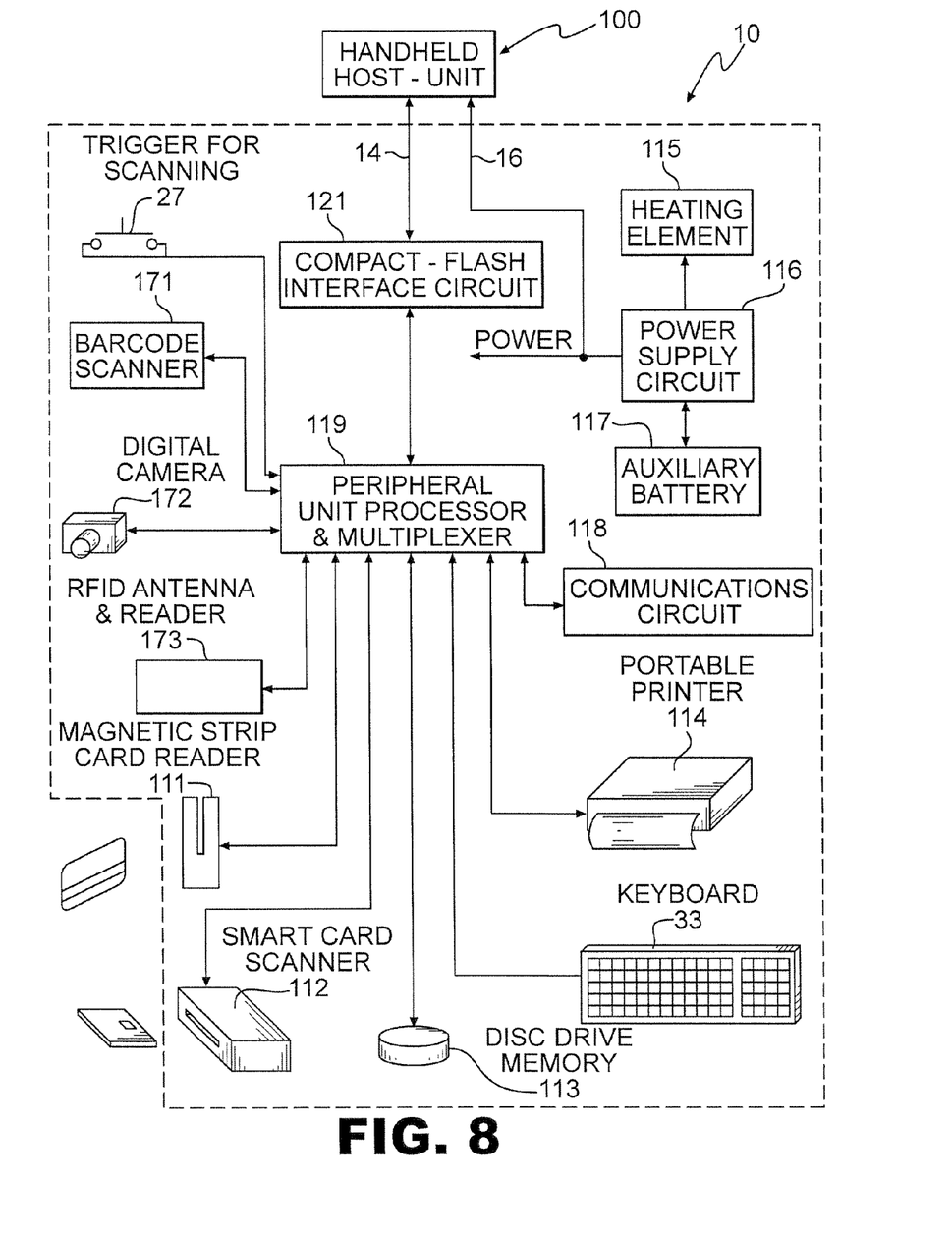
FIG. 8 is a block diagram representation of an embodiment of an exemplary device in accordance with the present invention.

In FIG. 8, various aspects and functions which may be implemented in the peripheral unit 10 according to the invention are described. As shown in the block diagram of FIG. 8, a peripheral unit 10 may have one or more functionalities provided in association with peripheral unit, to be integrated and used in a combined fashion with those capabilities and functions of a handheld host unit 100.

The handheld host unit 100 is shown to be interconnected to the peripheral unit 10 via various suitable connections, such as a ribbon cable 14 and compact flash (CF) interface circuit 121 as shown. Other suitable connections compatible with those standard connections associated with the handheld host unit 100 are contemplated. These connections are in turn connected to a peripheral unit processor and multiplexer 119 as an example. The peripheral unit processor and multiplexer 119, may in turn be connected to a variety of peripheral devices for adding functionality to the combined system with handheld host unit 100. As examples, the peripheral unit may include systems and functions selected from the group of scanning systems, such as a bar code scanner 171, or the like, a digital camera 172, RFID reader with antenna 173, magnetic strip card reader 111, smart card reader 112, disk drive memory 113, portable printer 114, communication circuit 118, and/or keyboard module 33. If a scanning device is provided, a trigger 27 or like actuator may be provided. These are only examples of possible peripheral devices which may be combined with peripheral unit 10 to add functionality to the handheld host unit 100. The peripheral unit 10 may also include an auxiliary battery 117, regulated by a power supply circuit 116, which may supply power to the components of the peripheral unit 10, and can also serve as backup power for the handheld host unit 100 by means of the DC jack 16 as previously described. Other desired functionalities may also be incorporated into peripheral unit 10, such as a heating element 115, enabling the use of the combined system with unit 10 and device 100 in extremely cold environments. Alternatively, other arrangements may be used for enhancing use in other environments.

All of these or other functional components which may be integrated into the unit 10 are readily available in the marketplace, and those skilled in the art should understand these and other types of devices and functions in accordance with the invention. Such embedded components will be integrated into unit 10 instead of being externally connected to a host device 100. Further, one or more of these components may be implemented, and although shown as having electrical connection to the peripheral unit processor and multiplexer 119, wireless connection is also contemplated. Thus for example, the keyboard module 33 may be wirelessly coupled for operation in association with host device 100. Thus, the peripheral unit 10 may be tailored for an application, where only one or more of the functional components may be used, such as for bar code scanning, or to include a smart card reader 112 and/or magnetic strip card reader 111, depending upon the application for use. All these variations are contemplated within the invention.

Although the present invention has been described above in detail, the same is by way of illustration and example only and is not be taken as a limitation on the present invention. Accordingly, the scope and content of the present invention are to be defined only by the terms of the appended claims.

What is claimed is:

1. A portable peripheral unit to provide additional electronic functionality when combined with an off-the-shelf host device comprising:
   a housing with a fixed width having a portion configured to engage with a portion of handheld host devices of various models having distinctly varying sizes;
   a keyboard module;
   an attachment mechanism associated with the housing, being used to secure the housing to a handheld host device, to form a handheld apparatus, wherein the attachment mechanism is secured to the host device by selective adjustment to adapt to a variable dimension of the host device;
   the attachment mechanism including a first set of at least two arms, wherein the first set of at least two arms attach to the handheld host device on substantially opposing side edges;
   at least one adjustment mechanism including at least one threaded aperture and at least one screw selectively engaged with the at least one threaded aperture to adjust the first set of arms;
   the at least one adjustment mechanism adapted to move at least one arm of the first set with respect to the other arm of the first set, relative to the fixed width of the housing, for adjustment of a space therebetween.

2. A portable peripheral unit according to claim 1 wherein each arm is terminated in one of a hook, flange or loop, each adapted to engage a portion of the handheld host device.

3. A portable peripheral unit according to claim 1, wherein the at least one adjustment mechanism comprises a mating pair of threaded fastener and threaded element, wherein rotation of the threaded fastener causes adjustment thereof.

4. A portable peripheral unit according to claim 1, wherein the attachment mechanism is a loop, being sized to loop around the handheld host device, the loop terminating into an adjustment mechanism adapted to vary the loop length.

5. A portable peripheral unit according to claim 1, wherein the keyboard module has a closed position covering a substantial portion of the front side of the handheld host device with which the portable peripheral unit is used, and an open position exposing a substantial portion of the front of the handheld host device.

6. A portable peripheral unit according to claim 1, wherein the keyboard module is hingedly attached to the housing for producing at least pivoting motion of the keyboard module.

7. A portable peripheral unit according to claim 6, wherein the hinged attachment can be varied between multiple positions along at least one of the length and the width of the portable peripheral unit based on host device dimensions.

8. A portable peripheral unit according to claim 1, wherein both the housing and the attachment mechanism are shaped and sized to mechanically shield a significant portion of the handheld host device when the housing is engaged therewith.

9. The portable peripheral unit of claim 1 wherein the portable peripheral unit includes at least one of the peripheral components selected from the group consisting of a barcode scanner, a RFID reader with antenna, a smart card reader, a magnetic strip card reader, a wireless local area network transceiver, a wireless wide area network transceiver, a telecommunication modem, a local area network transceiver, a disc drive memory, a trigger for scanning, a receiver for global positioning system (GPS), a portable printer, a heating element and combinations thereof.

10. The portable peripheral unit of claim 1 wherein the attachment mechanism includes a second set of at least two arms, and wherein the at least one adjustment mechanism has:

a first adjustment mechanism adapted to move at least one arm of the first set with respect to the other arm of the first set for adjustment of a space therebetween independent of the second set; and a second adjustment mechanism adapted to move at least one arm of the second set with respect to the other arm of the second set for adjustment of a space therebetween independent of the first set.

11. The portable peripheral unit of claim 1 wherein the first set of at least two arms are adjacent to a top portion of the housing.

12. The portable peripheral unit of claim 11 including:
a second set of at least two arms adjacent to a bottom portion of the housing.

13. The portable peripheral unit of claim 12 wherein the first set of at least two arms attach to the handheld host device on substantially opposing side edges on the top portion of the housing and the second set of at least two arms attach to the handheld host device on substantially opposing side edges on the bottom portion of the housing.

14. A portable peripheral unit for attachment to a portable electronic host device comprising:
a housing with a fixed width adapted for receiving one of a variety of host devices having at least two of varying length, width, and height;
an electronic circuit for completing a task when the host device is mounted in the housing;
a communication circuit adapted to communicate with the electronic circuit and with the host device when the host device is housed within the housing;
an attachment mechanism adapted for retaining the host within the housing;
the attachment mechanism including at least one arm, wherein the attachment mechanism attaches to the host device on substantially opposing side edges;
at least one adjustment mechanism for varying the attachment mechanism to accept the one of a variety of host devices having at least two of varying length, width, and height;
the at least one adjustment mechanism including at least one threaded aperture and at least one screw selectively engaged with the at least one threaded aperture to adjust the at least one arm;
the at least one adjustment mechanism adapted to move the at least one arm with respect to the remainder of the attachment mechanism for adjustment of a space therebetween; and
the at least one arm being terminated with a curved surface having a width to accommodate the handheld host device, and at least a corner of a respective edge;
at least one peripheral component operatively connected to the electronic circuit, and wherein the at least one peripheral component is selected from a group of peripheral components consisting of a barcode scanner, a RFID reader with antenna, a smart card reader, a magnetic strip card reader, a wireless local area network transceiver, a wireless wide area network transceiver, a telecommunication modem, a local area network transceiver, a disc drive memory, a trigger for scanning, a receiver for global positioning system (GPS), a portable printer, a heating element and combinations thereof.

15. A portable peripheral unit according to claim 14, wherein the at least one arm includes two arms forming a first set of arms, and wherein the attachment mechanism includes a second set of at least two arms, and wherein the at least one adjustment mechanism is adapted to move at least one of the following:

an arm of the first set with respect to the other arm of the first set, relative to the fixed width of the housing, for adjustment of a space therebetween; and
an arm of the second set with respect to the other arm of the second set, relative to the fixed width of the housing, for adjustment of a space therebetween.

16. A portable peripheral unit according to claim 14, wherein the at least one adjustment mechanism comprises a mating pair of threaded fastener and threaded element, wherein rotation of the threaded fastener causes adjustment thereof.

17. A portable peripheral unit according to claim 14, wherein the portable peripheral unit further comprises a keyboard module.

18. A portable peripheral unit according to claim 17, wherein the keyboard module has a closed position covering a substantial portion of a front side of the host device with which the portable peripheral unit is used, and an open position exposing a substantial portion of the front side of the host device.

19. A portable peripheral unit according to claim 17, wherein the keyboard module is hingedly attached to the housing for producing at least pivoting motion of the keyboard module.

20. A portable peripheral unit according to claim 14, wherein the communication circuit is adapted to communicate with the host device via wireless communication.

21. The portable peripheral unit of claim 14 wherein the at least one arm includes two arms forming a first set of arms, and wherein the first set of at least two arms are adjacent to a top portion of the housing.

22. The portable peripheral unit of claim 21 including:
a second set of at least two arms adjacent to a bottom portion of the housing.

23. The portable peripheral unit of claim 22 wherein the first set of at least two arms attach to the handheld host device on substantially opposing side edges on the top portion of the housing and the second set of at least two arms attach to the handheld host device on substantially opposing side edges on the bottom portion of the housing.

24. In combination, a portable peripheral unit for attachment to a portable electronic host device, and a portable electronic host device, the combination comprising:
one of a variety of host devices having different sizes, said host device having a first set of electronic circuits for completing a first set of tasks:
a portable peripheral unit having a second set of electronic circuits for completing a second set of tasks;
a peripheral unit housing for receiving the one of a variety of host devices having at least one of varying length, width, and height;
a communication circuit adapted to allow operative communication between the first electronic circuit of the host device and the second electronic circuit of the peripheral device when the host device is carried within the peripheral device housing;
an attachment mechanism for retaining the host within the housing;
the attachment mechanism includes a first set of at least two, wherein the first set of at least two arms attach to the host device on substantially opposing side edges;
at least one adjustment mechanism for varying the attachment mechanism to accept the one host devices having one of a varying length, width, and height;

the at least one adjustment mechanism including at least one threaded aperture and at least one screw selectively engaged with the at least one threaded aperture to adjust the first set of arms;

the at least one adjustment mechanism adapted to move at least one of the following:

an arm of the first set with respect to the other arm of the first set for adjustment of a space therebetween; and each of the at least two arms of the first set is terminated with a curved surface having a width to accommodate the handheld host device, and engage the front and back corners of their respective edges;

wherein the portable peripheral unit includes at least one of the peripheral components selected from the group consisting of a barcode scanner, a RFID reader with antenna, a smart card reader, a magnetic strip card reader, a wireless local area network transceiver, a wireless wide area network transceiver, a telecommunication modem, a local area network transceiver, a disc drive memory a trigger for scanning, a receiver for global positioning system (GPS), a portable printer, a heating element and combinations thereof.

25. The combination of claim 24, wherein the communication circuit forms a wireless link between the first electronic circuit of the host device and the second electronic circuit of the peripheral device when the host device is carried within the peripheral device housing, wherein the operative communication between the first circuit and the second circuit is wireless.

26. The combination of claim 24, wherein the attachment mechanism includes a first set of at least two arms adjacent to a top portion of the housing and a second set of at least two arms adjacent to a bottom portion of the housing, wherein the first set of at least two arms attach to the host device on substantially opposing sides and the second set of at least two arms attach to the host device on substantially opposing sides, with the at least one adjustment mechanism adapted to move at least one of the following:

an arm of the first set with respect to the other arm of the first set, relative to the fixed width of the housing, for adjustment of a space therebetween;

an arm of the second set with respect to the other arm of the second set, relative to the fixed width of the housing, for adjustment of a space therebetween.

27. The combination of claim 24, wherein the portable peripheral unit housing includes at least one of a handle and a holster associated therewith.

28. The combination of claim 24, wherein the portable peripheral unit further comprises a keyboard module.

29. The combination of claim 28, wherein the keyboard module has a closed position covering a substantial portion of a front side of the host device with which the portable peripheral unit is used, and an open position exposing a substantial portion of the front side of the host device.

30. The combination of claim 24 wherein the at least one of the peripheral components is operatively connected to the second set of electronic circuits to generate the second set of tasks.

31. The combination of claim 24 wherein the at least one peripheral component is operatively connected to the first set of electronic circuits through the communication circuit when the host device is carried within the portable peripheral unit.

32. The combination of claim 31, wherein the communication circuit provides wireless communication between the at least one peripheral component and the first set of electronic circuits.

33. The combination of claim 24 wherein the attachment is adapted to move at least one of the following:

an arm of the first set with respect to the other arm of the first set, relative to the fixed width of the housing, for adjustment of a space therebetween; or an arm of the second set with respect to the other arm of the second set, relative to the fixed width of the housing, for adjustment of a space therebetween.

34. The portable peripheral unit of claim 24 wherein the first set of at least two arms are adjacent to a top portion of the housing.

35. The portable peripheral unit of claim 34 including:

a second set of at least two arms adjacent to a bottom portion of the housing.

36. The portable peripheral unit of claim 35 wherein the first set of at least two arms attach to the handheld host device on substantially opposing side edges on the top portion of the housing and the second set of at least two arms attach to the handheld host device on substantially opposing side edges on the bottom portion of the housing.

37. A portable peripheral unit, shaped and sized to mate with off-the-shelf handheld host devices to form a one-piece integrated handheld system, comprising:

a housing with an electronic circuit for completing a task and a communication circuit adapted to communicate with the electronic circuit and with the host device when the host device is mounted in the housing;

said housing having a fixed width portion suitably narrower than the host device to allow unobtrusive handheld operation of the combined unit;

an attachment mechanism associated with the housing, being used to secure the housing to the host device, wherein the attachment mechanism is secured to the host device by selective adjustment to adapt to a variable dimension of the host device;

the said portable peripheral unit includes at least one of the peripheral components selected from the group consisting of a barcode scanner, a RFID reader with antenna, a smart card reader, a magnetic strip card reader, a wireless local area network transceiver, a wireless wide area network transceiver, a telecommunication modem, a disc drive memory, a trigger for scanning, a receiver for global positioning system (GPS), a portable printer, a heating element and combinations thereof, and the attachment mechanism comprises at least two arms attaching to the handheld host device on substantially opposing side edges, an adjustment mechanism adapted to move at least one of the arms with respect to the other arm for adjustment of the space there between, wherein the said adjustment mechanism is a mating pair of a threaded fastener and a threaded element, wherein rotation of the threaded fastener causes adjustment thereof.

38. A portable peripheral unit according to claim 37 wherein each of the two arms is terminated with a curved surface having a width to accommodate the handheld host device and engage the front and back corners of their respective edges.

39. A portable peripheral unit according to claim 37 wherein the position of the housing is adjustable in at least one of the lateral direction along the arms and the longitudinal direction.

40. A portable peripheral unit, shaped and sized to mate with off-the-shelf handheld host devices to form a one-piece integrated handheld system, comprising:

a keyboard module;

a housing with an electronic circuit for completing a task and a communication circuit adapted to communicate with the electronic circuit and with the host device when the host device is mounted in the housing;

said housing having a fixed width portion suitably narrower than the host device to allow unobtrusive handheld operation of the combined unit;

an attachment mechanism associated with the housing, being used to secure the housing to the host device, wherein the attachment mechanism is secured to the host device by selective adjustment to adapt to a variable dimension of the host device;

the said portable peripheral unit includes at least one of the peripheral components selected from the group consisting of a barcode scanner, a RFID reader with antenna, a smart card reader, a magnetic strip card reader, a wireless local area network transceiver, a wireless wide area network transceiver, a telecommunication modem, a disc drive memory, a trigger for scanning, a receiver for global positioning system (GPS), a portable printer, a heating element and combinations thereof.

41. A portable peripheral unit according to claim 40, wherein the keyboard module has a closed position covering a substantial portion of the front side of the host device with which the portable peripheral unit is used, and an open position exposing a substantial portion of the front of the handheld host device.

42. A portable peripheral unit according to claim 40, wherein the keyboard module is hingedly attached to the housing for producing at least pivoting motion of the keyboard module.

43. A portable peripheral unit, shaped and sized to mate with off-the-shelf handheld host devices to form a one-piece integrated handheld system, comprising:

a housing with an electronic circuit for completing a task and a communication circuit adapted to communicate with the electronic circuit and with the host device when the host device is mounted in the housing;

said housing having a fixed width portion suitably narrower than the host device to allow unobtrusive handheld operation of the combined unit;

an attachment mechanism associated with the housing, being used to secure the housing to the host device, wherein the housing is secured to the host device by having an adhesive coated surface on the housing that is adhered to the bottom of the handheld host devices, thereby adapting to a variable dimension of the host device;

the said portable peripheral unit includes at least one of the peripheral components selected from the group consisting of a barcode scanner, a RFID reader with antenna, a smart card reader, a magnetic strip card reader, a wireless local area network transceiver, a wireless wide area network transceiver, a telecommunication modem, a disc drive memory, a trigger for scanning, a receiver for global positioning system (GPS), a portable printer, a heating element and combinations thereof.

* * * * *

UNITED STATES PATENT AND TRADEMARK OFFICE
CERTIFICATE OF CORRECTION

| | | |
|---|---|---|
| PATENT NO. | : 8,783,574 B2 | Page 1 of 1 |
| APPLICATION NO. | : 11/568342 | |
| DATED | : July 22, 2014 | |
| INVENTOR(S) | : Kumar | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this
Fifteenth Day of December, 2015

Michelle K. Lee
*Director of the United States Patent and Trademark Office*